Dec. 27, 1960 J. G. V. ISABEAU 2,966,306

COMPUTING APPARATUS

Filed June 19, 1956 4 Sheets-Sheet 1

JEAN G. V. ISABEAU
*INVENTOR.*

*BY* John J. Pederson
HIS ATTORNEY.

JEAN G. V. ISABEAU
*INVENTOR.*

BY John J. Pederson
HIS ATTORNEY

JEAN G. V. ISABEAU
*INVENTOR.*

BY John J. Pederson

HIS ATTORNEY.

Dec. 27, 1960 J. G. V. ISABEAU 2,966,306

COMPUTING APPARATUS

Filed June 19, 1956 4 Sheets-Sheet 4

JEAN G. V. ISABEAU
*INVENTOR.*

BY John J. Pederson

HIS ATTORNEY.

United States Patent Office 2,966,306
Patented Dec. 27, 1960

2,966,306

COMPUTING APPARATUS

Jean G. V. Isabeau, Berwyn, Ill., assignor to Zenith Radio Corporation, a corporation of Delaware Filed June 19, 1956, Ser. No. 592,393
Claims priority, application Belgium July 2, 1955
17 Claims. (Cl. 235—194)

This invention relates to the computing field and more particularly to a novel method and apparatus for determining the product of two control effects divided by a third control effect, where the control effects may be either constant or varying and of either positive, negative or alternating polarity.

Computing apparatus for performing product and quotient computations are employed in a variety of different environments, such as in analogue computers and simulators. It is an object of the present invention to provide a novel computing apparatus which may be utilized in such a wide variety of environments.

It is another object of the invention to provide such a computing apparatus that responds rapidly.

It is still another object of the invention to provide such a computing apparatus that requires relatively simple adjustments.

It is a further object of the invention to provide a computing apparatus that multiplies two control effects and divides by a third, where the control effects may be either constant or varying and of either positive, negative or alternating polarity.

Computing apparatus, constructed in accordance with the invention, derives the product of second and third electrical control effects divided by a first electrical control effect, where the control effects may be either constant or varying and of either positive, negative or alternating polarity. The apparatus comprises means including resonant means for developing first and second signals representing alternating time functions and having corresponding characteristics determined by the first and second control effects, respectively. A load device is provided and also means for applying a signal derived from the second signal to the load device during an interval determined by a condition of instantaneous coincidence between the characteristics of the first signal and a corresponding characteristic of the third control effect.

The features of this invention which are believed to be new are set forth with particularity in the appended claims. The invention, together with further objects and advantages thereof, may best be understood, however, by reference to the following description in conjunction with the accompanying drawings, in which:

Figure 1:
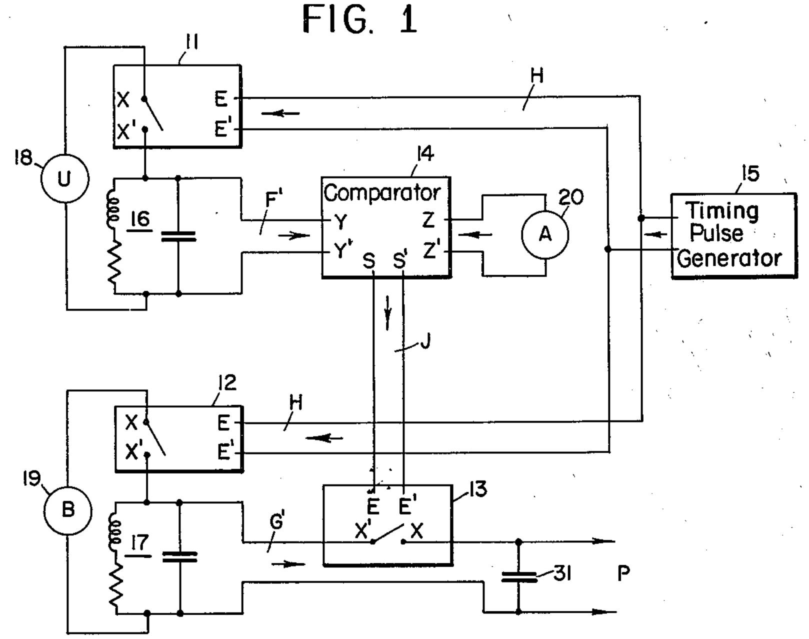
Figure 1 is a schematic diagram of a computing arrangement constructed in accordance with one embodiment of the invention.

Referring to Figure 1, a voltage source 18, which may produce either a constant or varying voltage, designated U, of either positive or negative polarity, is connected in series with a normally-open electronic switching device 11 and a linear network in the form of a parallel resonant circuit 16. A second voltage source 19 which may also produce either a constant or varying voltage (labelled voltage B) of either positive or negative polarity is connected in series with a normally-open electronic switching device 12 and another linear network or parallel resonant circuit 17 which is preferably constructed in identical manner to resonant circuit 16. A timing pulse generator 15 is coupled to switches 11 and 12 to control the operation thereof. A third voltage source 20, which develops a constant or varying voltage A of either positive or negative polarity, is coupled to a coincidence detector or comparator 14 which has another pair of input terminals connected to parallel resonant circuit 16 and a pair of output terminals connected to a normally-open electronic switch 13 to control the operation thereof. A load impedance in the form of a condenser 31 has one of its terminals connected to one side of resonant circuit 17 and its other terminal connected through switch 13 to the other side of resonant circuit 17. With this arrangement, switch 13 serves as a gating device, specifically a sampling device, condenser 31 assuming a charge each time the switch is closed of magnitude and polarity determined by the instantaneous value of the voltage across resonant circuit 17.

Before discussing the detailed operation of the computer of Figure 1, consideration will be given to the simplified diagram of Figure 2 and the wave forms of Figure 3. Voltage source 18 of Figure 1, which produces voltage U, is shown simply as a source of direct voltage U in Figure 2 with its positive terminal connected through switch 11 to the top of resonant circuit 16 and with its negative terminal connected to the bottom of circuit 16. Similarly, voltage source 19, which produces voltage B, is shown as a direct voltage source B with its negative terminal connected through switch 12 to the top of resonant circuit 17 and with its positive terminal connected to the bottom of circuit 17. Voltage source 20, which develops voltage A, is shown as a direct voltage source A. If switch 11 is closed momentarily, resonant circuit 16 is connected directly across the source of voltage U and thus the condenser of the resonant circuit charges immediately to voltage U; resonant circuit 16 is consequently shock excited into oscillation to produce the damped sinusoidal shaped signal F shown in the upper portion of Figure 3. It will be noted that the initial value of that signal equals the voltage U.

Figure 3:
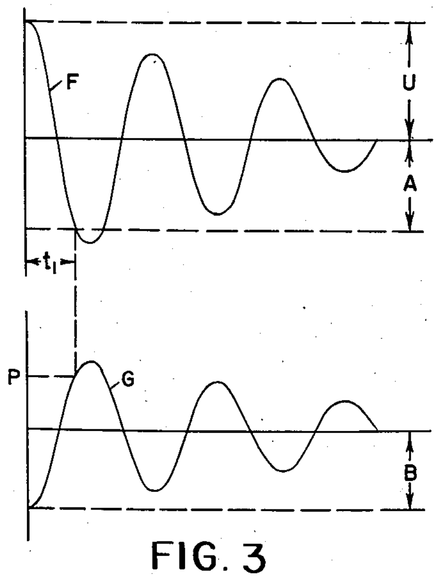
Figure 3 shows two wave forms that are helpful in explaining the operation of the diagram of Figure 2.

Assuming now that the amplitude of voltage A crosses or coincides with the oscillating voltage F developed across resonant circuit 16 at some point as shown at time $t_1$ in Figure 3, comparator 14 responds to the instantaneous equality of input signals to produce a sampling pulse for application to switch or sampler 13.

Meanwhile, since switch 12 is operated simultaneously with switch 11, as shown by the dashed construction line 30, resonant circuit 17 has also been shock excited into oscillation with the initial polarity and amplitude of the voltage developed across the resonant circuit being equal to voltage B as shown by curve G in Figure 3. Since linear networks or resonant circuits 16 or 17 are preferably identical in construction, the damped sinusoidal wave forms F and G developed therein will have identical shapes but different peak amplitudes and polarities as determined by the amplitudes and polarities of voltages U and B. Consequently, the zero cross-over points of curves F and G occur simultaneously or in time coincidence.

The sampling pulse developed at time $t_1$ operates sampler or switch 13 to impress the instantaneous voltage of wave form G on condenser 31. In other words, voltage wave form G is sampled or read at time $t_1$ and at that time the voltage value is designated P.

Consequently, with direct voltage A permanently applied to comparator 14 and with direct voltages U and B momentarily applied to resonant circuits 16 and 17, respectively, a voltage P is developed across condenser 31. It is now a relatively simple matter to demonstrate that voltage P equals the product of voltages A and B divided by voltage U. Wave form F is some time function $f(t)$, as determined by the characteristics of resonant circuit 16, and its equation may be simply stated as $Uf(t)$ since the initial amplitude of that signal is voltage U. At time $t_1$, $Uf(t)=A$. Similarly, curve G is some time function $f(t)$, as determined by the characteristics of circuit 17, and its equation may be represented simply as $Bf(t)$ since its initial amplitude is voltage B. At time $t_1$, $Bf(t)=P$. Since resonant circuits 16 and 17 are identical in construction, the time functions of curves F and G will be identical and thus $$f(t)=\frac{A}{U}=\frac{P}{B} \text{ and } P=\frac{AB}{U}$$

In order to provide accurate computation for all conditions, including those in which the quotient $$\frac{A}{U}$$

reverses in sign, $f(t)$ must be an alternating time function, i.e., must change sign within the available time for making the computation.

Figure 4:
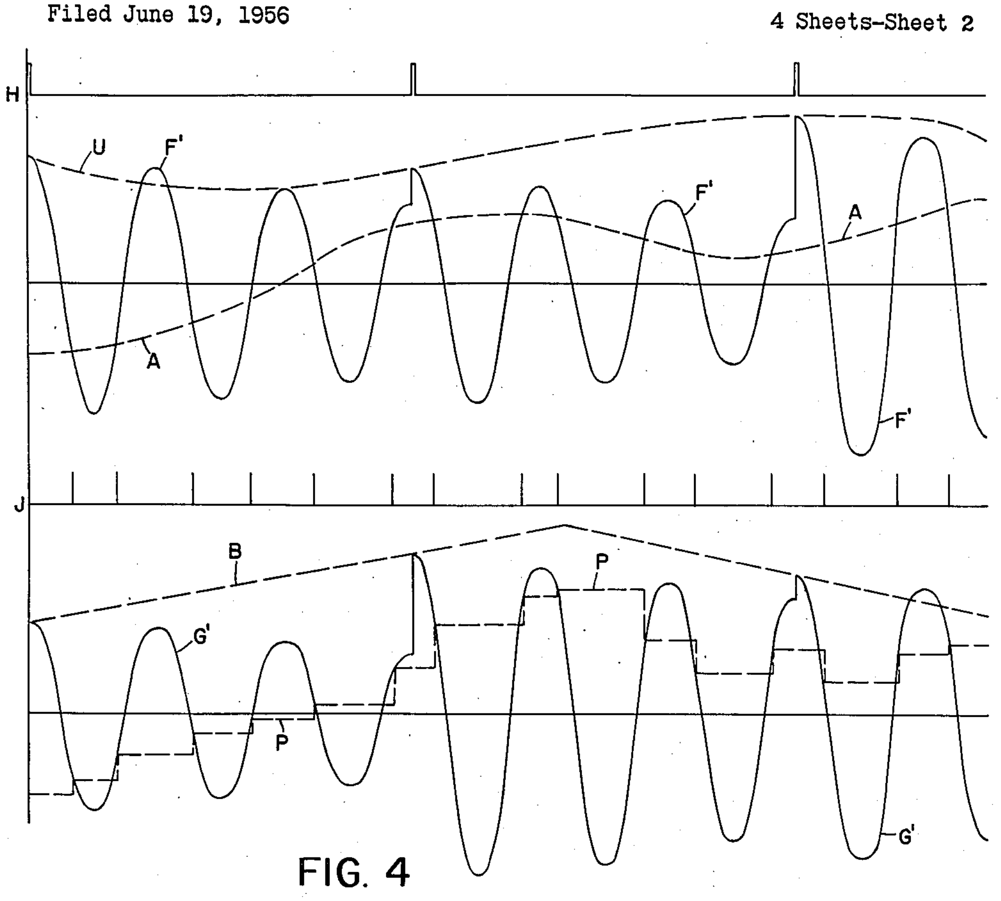
Figures 4, 5 and 6 illustrate various wave forms utilized to explain the detailed operation of the computing arrangement of Figure 1.

Turning now to the operation of the arrangement of Figure 1 and referring particularly to the wave forms of Figure 4, it will be shown that the same concept is employed to compute the product and quotient of varying voltages. Assume that the pulses of curve H are developed in timing pulse generator 15 and are applied to switches 11 and 12. Assume further that voltage U varies as shown in dashed outline in Figure 4. In response to the first pulse of curve H the condenser of linear network or resonant circuit 16 charges to the value of voltage U at that instant. Oscillations are thus initiated and a sinusoidal voltage is developed across resonant circuit 16 as shown by wave form F'. When the next or second pulse from curve H occurs and momentarily closes switch 11, the voltage across the condenser 16 is less than the instantaneous value of voltage U and thus the condenser charges substantially instantaneously to that value and another series of damped sinusoidal oscillations are initiated. When the third or last pulse of curve H is applied to switch 11, the value of voltage U is considerably higher than that of voltage wave form F' and consequently the condenser charges to that value.

Assume now that voltage A varies as shown in dashed construction. Thus, each time voltage A intersects or coincides with wave form F', coincidence detector or comparator 14 responds thereto to produce a sampling pulse. These pulses are shown in curve J and are employed to close sampler or switch 13.

Assume further that voltage B varies in triangular fashion as shown in dashed outline in Figure 4 and thus each time a timing pulse of curve H occurs a different series of damped sinusoidal oscillations (curve G') are produced in resonant circuit 17 with the initial or peak amplitude being determined by the instantaneous value of voltage B at the occurrence of each timing pulse. Sampling pulses J are effective to sample or read wave form G in order to produce a potential across condenser 31 which has the wave form shown by curve P in dashed construction in Figure 4. The signal of curve P represents the product of A and B divided by U for the same reasons as described hereinbefore in connection with Figure 2. Of course, since voltages A, B and U are varying, voltage P also varies. If desired, wave form P may be "smoothed out" by means of any suitable wave shaping network such as a low-pass filter.

Figure 2:
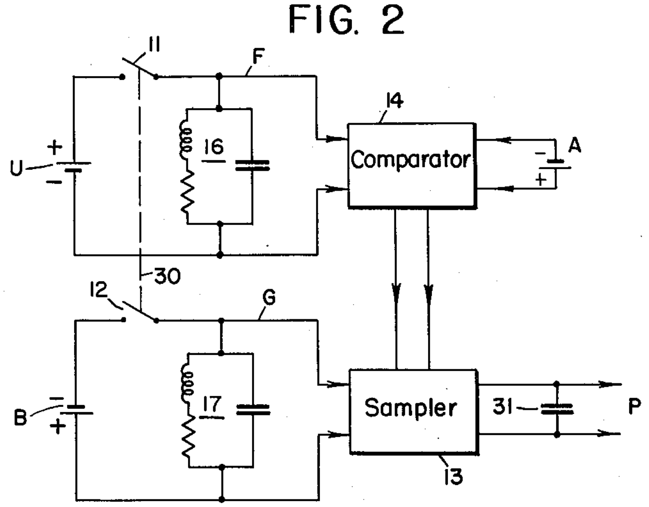
Figure 2 is a modified and simplified redrawing of the computing arrangement of Figure 1 and is utilized in order to present a clear explanation of the arrangement of Figure 1.

In the Figure 2 illustration, resonant circuits 16 and 17 were connected to the sources of voltages U and B, respectively, only for one short instant. When voltages A, B and U are constant, only one momentary closing of switches 11 and 12 is necessary in order to compute the product and quotient. On the other hand, the wave forms of Figure 4 demonstrate that switches 11 and 12 must be closed momentarily from time to time in order to successfully effect a series of computations which collectively determine the dynamic product and quotient of the variable input voltages.

By way of summary, Figure 1 discloses a computing arrangement which comprises a source 18 for providing a first electrical control effect in the form of a voltage U. Resonant circuit 16 constitutes a first linear network. Generator 15 and switch 11 constitute means for translating the first control effect U to the first linear network 16 to produce a first signal F' exhibiting a predetermined wave shape. Source 19 provides a second electrical control effect in the form of a voltage B, and parallel resonant circuit 17 is a second linear network. Generator 15 and switch 12 may be considered means for translating the second control effect B to the second linear network 17 to produce a second signal G' exhibiting a wave shape related to the predetermined wave shape of curve F'. Specifically, wave shapes G' and F' are identically shaped but their peak amplitudes and polarities may vary under the control of voltages U and B. Source 20 provides a third electrical control effect in the form of a voltage A which has a predetermined characteristic (amplitude) which coincides or intersects with a corresponding characteristic of the first signal F' during a certain time interval. Of course, there are several intervals of coincidence between voltage wave forms A and F' in Figure 4 but under certain conditions, such as when voltages A, B and U are constant as discussed hereinbefore, only one such interval of coincidence is required to achieve the results of the invention.

Comparator 14 and sampling switch 13 constitute means coupled to the first linear network 16, the second linear network 17 and to the third control effect source 20 for sampling the second signal G' during a time interval determined by the interval of coincidence between the corresponding amplitude characteristics of the first signal F' and the third control effect A. Finally, condenser 31 and the circuitry connecting it to resonant circuit 17 constitutes means including a load device coupled to the sampling means for deriving an output signal (voltage wave form P) directly proportional to the product of the second and third control effects (B and A) and inversely proportional to the first control effect U.

Figure 5:
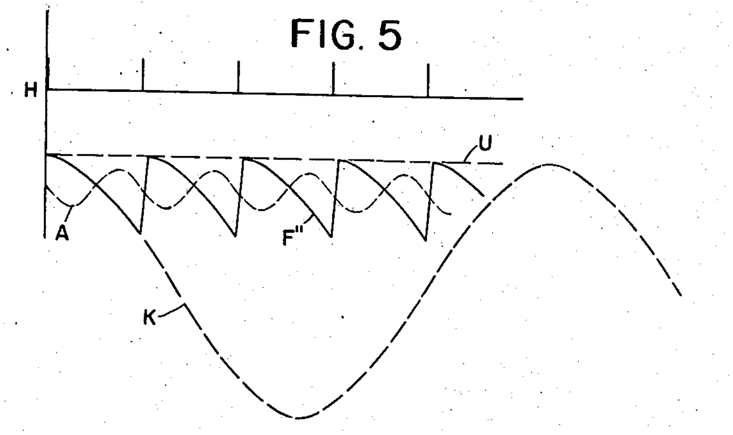

In Figure 4, it is shown that wave forms F' and G' complete a number of sinusoidal cycles between operations of switches 11 and 12. However, that need not necessarily be the case, as shown by the wave forms of Figure 5. Here the timing pulses of curve H developed in generator 15 recur at a frequency that is higher than the resonant frequency of networks 16, 17. Wave form K in Figure 5, most of which is illustrated in dashed construction, exhibits the resonant frequency of network 16 and if switch 11 is closed in response to each pulse of curve H the condenser of resonant circuit 16 charges during a finite time interval to voltage U (this voltage being constant for this particular illustration) to form a sinusoidal wave of generally saw tooth wave form F''. Wave form A is shown in Figure 5 as having the same frequency as wave form F″ and it will be noted that two intersections are made between wave forms A and F″ for each cycle. Thus, the highest frequency in wave form A is effectively sampled twice for each cycle which is all that is required to accurately reproduce the sampled signal in accordance with well known information or sampling theory. Of course, if the frequency components of curve A are greater than the frequency of F″, some information will be lost and an accurate computation cannot be made.

Figure 6:
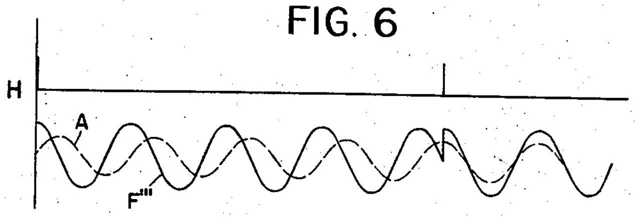

In Figure 6, the timing pulses of curve H recur less frequently than the resonant frequency of network 16. Consequently, the signal F‴ developed across network 16 completes one or more full sine wave cycles between successive actuations of switch 11. Such conditions are, of course, similar to those established in the exemplary operation illustrated by the wave forms of Figure 4. Additionally, wave form F‴ has been illustrated with negligible damping. As in the case of Figure 5, voltage wave form A exhibits the same frequency as wave form F‴ and thus two intersections or intervals of coincidence exist for each cycle of voltage A. Again, if the frequency of wave form F‴ is less than the frequency of voltage A, computation cannot be realized without loss of information.

Thus, it has been demonstrated that the wave form of the voltage developed in resonant circuit 16 (and, of course, the voltage wave form produced across network 17) is determined not only by the resonant frequency of the network but also by the rate or frequency of actuation of switch 11 (and switch 12 for network 17). Since there must be at least two intervals of coincidence between curves A and F (or the F primed curves) for each cycle of curve A, it should be stated that the highest frequency component of curve A should be not greater than the frequency of curve F, or stated differently, the frequency of curve F should be established such that it is never less than the frequency of curve A.

From an observation of the various wave forms shown in Figure 4, it should be apparent that some of the signals are sampled more frequently than others. For example, curve A is sampled more often than B, therefore providing wide band translation of A and narrow band translation of B. The spectrum of the product P will be included in a bandwidth that is the sum of the bandwith of A and the bandwidth of B.

Figure 7:
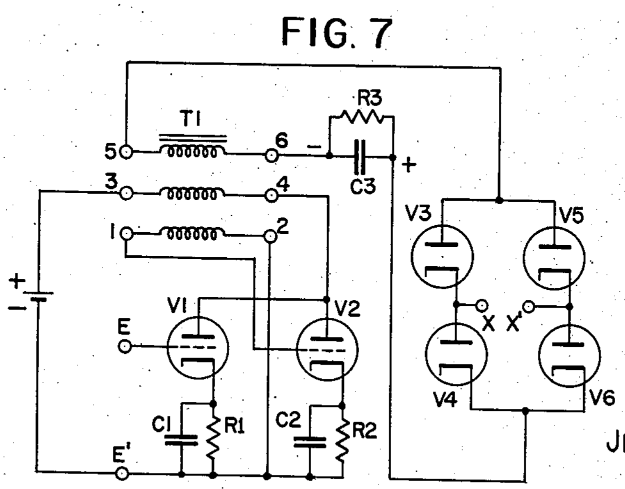
Figures 7 and 8 illustrate in detail certain portions of the computing arrangement of Figure 1.

Consideration will now be given to the circuit shown in Figure 7 which illustrates an electronic switch which may be employed for either switch 11 or switch 12. Of course, it should be understood that any other suitable switching device may be employed and that shown in Figure 7 is only illustrated by way of example. The circuit of Figure 1 established two terminals X and X′ in bilateral electrical contact in response to a control pulse applied between terminals E and E′. A bilateral electrical connection is one in which current flows between terminals X and X′ in the direction of the potential difference between these two terminals, and in which the resistance encountered is small. A blocking oscillator is provided which comprises a triode V2 and a three-winding transformer T1. A trigger circuit is provided which consists of a triode V1 and a bridge circuit including diodes V3—V6.

In the operation of the switch of Figure 7, normally no current passes through tube V2 and a very low current is translated through V1. When a positive pulse is applied at terminal E from timing generator 15, triode V1 creates a current flow through transformer winding 3—4 which, in turn, establishes a flux field to induce a voltage in winding 1—2 to cause current flow in triode V2. Well known blocking oscillator action takes place and the current from tube V2 rapidly becomes very large to produce a high amplitude pulse which is induced in transformer winding 5—6. The voltage in this winding establishes a current flow in diodes V3—V6 resulting in the accumulation of a charge of the indicated polarity in condenser C3. The time constant of R3 and C3 is made large, so that condenser C3 assumes a charge to a constant voltage which is substantially equal to the peak voltage of the pulse.

In the absence of a pulse, the diodes V3—V6 are negatively biased by the potential across condenser C3 and therefore terminals X and X′ appear as an open circuit. However, during the duration of each pulse supplied to terminals E and E′, which results in the development of a high amplitude voltage pulse of opposite polarity across transformer winding 5—6, the bias is overcome and current is permitted to flow between terminals X and X′ in the direction of the potential difference between the two terminals.

Figure 8:
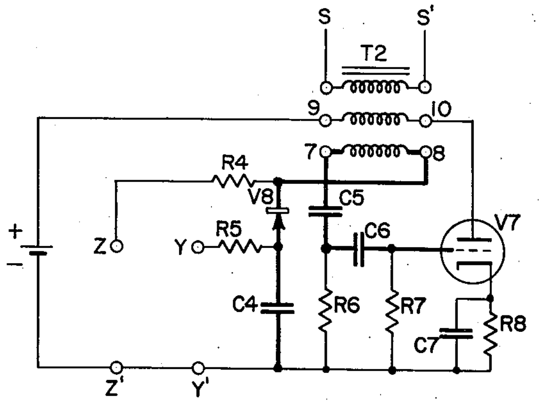

Figure 8 illustrates one type of comparator or coincidence detector that may be employed for unit 14 in Figure 1. Again, many other suitable comparators may be utilized in the combination of Figure 1. Unit 14 provides a voltage pulse between terminals S and S′ at the instant that the two voltages impressed across terminals YY′ and ZZ′ are equal. The comparator includes a blocking oscillator which comprises a triode V7 and a three-winding transformer T2. Triode V7 is biased in such a way that normally a low value of current is translated through winding 9—10 of transformer T2. The grid circuit of tube V7, which is shown in heavy line consturction in Figure 8, is completed through a diode V8, which prevents feed back when the diode is not conducting. It becomes conductive whenever the voltages impressed across terminals YY′ and ZZ′ are such that the potential of terminal Y is positive with respect to that of terminal Z. When this occurs the blocking oscillator functions to produce a voltage pulse between terminals S and S′. Condenser C6 and resistance R7 render the comparator inoperative for a given time after each pulse developed between terminals S and S′, this time interval being longer than the longest interval during which the potential of terminal Y might conceivably remain higher than that of terminal Z.

Figure 9:
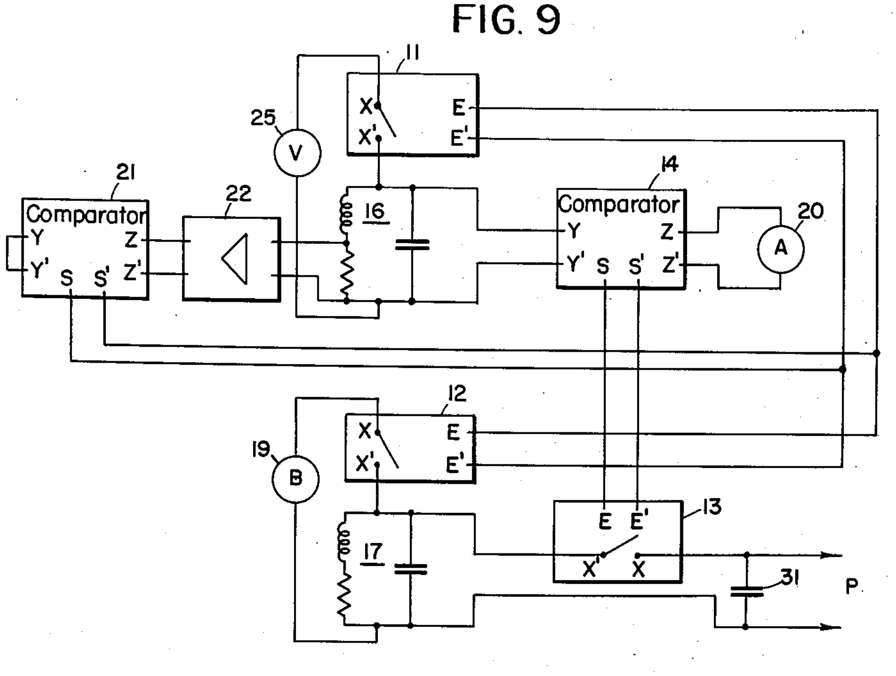
Figure 9 shows a schematic diagram of a computing arrangement constructed in accordance with another embodiment of the invention.

In order to construct the computing arrangement of Figure 1 to operate properly in response to relatively fast or rapid variations of voltages A, B and U, certain conditions may be established. For example, the effect of condenser 31 on resonant circuit 17 should be made as small as possible. This may be achieved by adjusting the capacitance of condenser 31 to be very small with respect to the capacitance of resonant circuit 17 or, in the alternative, by introducing a buffer amplifier between resonant circuit 17 and switch 13. Additionally, the computing arrangement may be designed to respond to fast variations of the applied voltages by insuring that the instants of operation of switches 11 and 12 occur during time intervals when the current in the inductive portions of resonant circuits 16, 17 crosses through zero. If the frequency of the timing pulses is exactly equal to that of the resonant circuits, oscillation will stabilize in such a way that the current through the inductance portions will cross through zero at the instance of switch closing. This can be obtained with the apparatus of Figure 9.

A resistor in series with the inductance coil of resonant circuit 16 develops a voltage which is proportional to and in phase with the current which flows in the inductance. This voltage is amplified in amplifier 22 and is applied to one of the inputs of a comparator 21, which is constructed in identical manner as comparator 14. The other input of comparator 21 is short circuited. A pulse is developed at the output of comparator 21 and may be used to trigger switch 11 in place of a timing pulse from generator 15.

Thus it will be seen that the present invention provides new and improved computing apparatus for accurately deriving the product of two electrical control effects A and B divided by an additional electrical control effect U under widely varying conditions, including conditions in which one or more of the control effects reverses in sign. In accordance with the invention, this is accomplished by developing first and second signals representing alternating time functions and having a corresponding characteristic, such as an amplitude characteristic, determined by control effects U and B respectively. The apparatus of the invention further comprises a load device and means for applying a signal derived from the second signal (that derived from B) to the load device during an interval determined by a condition of instantaneous coincidence between the predetermined characteristic of the first signal (that derived from U) and the corresponding characteristic of the third control effect A. Preferably, the first signal (that derived from U) and the third control effect A are compared in a coincidence detector which develops a gating signal in response to a condition of instantaneous coincidence therebetween, and this gating signal is applied to a gating device such as a sampling circuit which also receives the second signal (that derived from B) and applies a signal to the load device during an interval determined by the condition of instantaneous coincidence giving rise to the gating pulse.

While particular embodiments of the invention have been shown and described, modifications may be made, and it is intended in the appended claims to cover all such modifications as may fall within the true spirit and scope of the invention.

I claim:

1. Computing apparatus for deriving the product of second and third electrical control effects divided by a first electrical control effect, where the control effects may be either constant or varying and of either positive, negative or alternating polarity, comprising: means including resonant means for developing first and second signals representing alternating time functions and having corresponding characteristics determined by said first and second control effects, respectively; a load device; and means for applying a signal derived from said second signal to said load device during an interval determined by a condition of instantaneous coincidence between said characteristic of said first signal and a corresponding characteristic of said third control effect.

2. Computing apparatus for deriving the product of second and third electrical control effects divided by a first electrical control effect, where the control effects may be either constant or varying and of either positive, negative or alternating polarity, comprising: means including resonant means for developing first and second signals representing alternating time functions and having corresponding characteristics determined by said first and second control effects, respectively; a coincidence detector coupled to said signal-developing means for developing a gating signal in response to a condition of instantaneous coincidence of said characteristic of said first signal and a corresponding characteristic of said third control effect; a load device; and means including a gating device coupled to said signal-developing means and to said coincidence detector and responsive to said gating signal for applying a signal derived from said second signal to said load device during an interval determined by said condition of instantaneous coincidence.

3. Computing apparatus for deriving the product of second and third electrical control effects divided by a first electrical control effect, where the control effects may be either constant or varying and of either positive, negative or alternating polarity, comprising: means including resonant means for developing first and second signals representing alternating time functions and having corresponding characteristics determined by said first and second control effects, respectively; a coincidence detector coupled to said signal-developing means for developing a gating signal in response to instantaneous coincidence of said characteristic of said first signal and a corresponding characteristic of said third control effect; a load device; and means including a gating device coupled to said signal-developing means and to said coincidence detector and responsive to said gating signal for sampling said second signal during the intervals of instantaneous coincidence to apply a signal to said load device.

4. Computing apparatus comprising: a source for providing a first electrical control effect which may be either constant or varying and of either positive, negative or alternating polarity; a first linear resonant network; means for translating said first control effect to said first linear resonant network to produce a first signal; a source for providing a second electrical control effect which may be either constant or varying and of either positive, negative or alternating polarity; a second linear resonant network; means for translating said second control effect to said second linear resonant network to produce a second signal; a source for providing a third electrical control effect which may be either constant or varying and of either positive, negative or alternating polarity and having a predetermined characteristic which coincides with a corresponding characteristic of said first signal during a certain time interval; means coupled to said first and second linear resonant networks and to said third control effect source for sampling said second signal during a time interval determined by said interval of coincidence between said corresponding characteristics of said first signal and said third control effect; and means including a load device coupled to said sampling means for deriving an output signal directly proportional to the product of said second and third control effects and inversely proportional to said first control effect.

5. Computing apparatus comprising: a source for providing a first electrical control effect which may be either constant or varying and of either positive, negative or alternating polarity; a first passive oscillatory network; means for momentarily translating said first control effect to said first passive oscillatory network to initiate a first signal exhibiting a predetermined wave shape; a source for providing a second electrical control effect which may be either constant or varying and of either positive, negative or alternating polarity; a second passive oscillatory network; means for momentarily translating said second control effect to said second passive oscillatory network to initiate a second signal exhibiting a wave shape related to said predetermined wave shape; a source for providing a third electrical control effect which may be either constant or varying and of either positive, negative or alternating polarity and having a predetermined characteristic which coincides with a corresponding characteristic of said first signal during a certain time interval; means coupled to said first and second passive oscillatory networks and to said third control effect source for sampling said second signal during a time interval determined by said interval of coincidence between said corresponding characteristics of said first signal and said third control effect; and means including a load device coupled to said sampling means for deriving an output signal directly proportional to the product of said second and third control effects and inversely proportional to said first control effect.

6. Computing apparatus comprising: a source for providing a first electrical control effect which may be either constant or varying and of either positive, negative or alternating polarity; a first linear resonant network; means for translating said first control effect to said first linear resonant network to produce a first signal exhibiting a predetermined wave shape and having a characteristic determined by said first control effect; a source for providing a second electrical control effect which may be either constant or varying and of either positive, negative or alternating polarity; a second linear resonant network substantially identical with said first linear network; means for translating said second control effect to said second linear resonant network to produce a second signal exhibiting a wave shape similar to said predetermined wave shape and having a corresponding characteristic determined by said second control effect; a source for providing a third electrical control effect which may be either constant or varying and of either positive, negative or alternating polarity and having a predetermined characteristic which coincides with said characteristic of said first signal during a certain time interval; means coupled to said first and second linear resonant networks and to said third control effect source for sampling said second signal during a time interval determined by said interval of coincidence between said corresponding characteristics of said first signal and said third control effect; and means including a load device coupled to said sampling means for deriving an output signal directly proportional to the product of said second and third control effects and inversely proportional to said first control effect.

7. Computing apparatus comprising: a source for providing a first electrical control effect which may be either constant or varying and of either positive, negative or alternating polarity; a first linear resonant network; means for momentarily translating said first control effect to said first linear resonant network to initiate a first signal exhibiting a predetermined wave shape; a source for providing a second electrical control effect which may be either constant or varying and of either positive, negative or alternating polarity; a second linear resonant network; means for momentarily translating said second control effect to said second linear resonant network, simultaneously with the translation of said first control effect to said first linear network, to initiate a second signal exhibiting a wave shape related to said predetermined wave shape; a source for providing a third electrical control effect which may be either constant or varying and of either positive, negative or alternating polarity and having a predetermined characteristic which coincides with a corresponding characteristic of said first signal during a certain time interval; means coupled to said first and second linear resonant networks and to said third control effect source for sampling said second signal during said time interval of coincidence between said corresponding characteristics of said first signal and said third control effect; and means including a load device coupled to said sampling means for deriving an output signal directly proportional to the product of said second and third control effects and inversely proportional to said first control effect.

8. Computing apparatus comprising: a source for providing a first voltage which may be either constant or varying and of either positive, negative or alternating polarity; a first resonant circuit; means for momentarily applying said first voltage to said first resonant circuit to initiate a first sinusoidal signal of a phase and peak amplitude determined by said first voltage; a source for providing a second voltage which may be either constant or varying and of either positive, negative or alternating polarity; a second resonant circuit; means for momentarily applying said second voltage to said second resonant circuit to initiate a second sinusoidal signal of a phase and peak amplitude determined by said second voltage; a source for providing a third voltage which may be either constant or varying and of either positive, negative or alternating polarity and having an amplitude which coincides with that of said first signal during a certain time interval; means coupled to said first and second resonant circuits and to said third voltage source for sampling said second signal during a time interval determined by said interval of coincidence between the amplitudes of said first signal and said third voltage; and means including a load device coupled to said sampling means for deriving an output signal directly proportional to the product of said second and third voltages and inversely proportional to said first voltage.

9. Computing apparatus comprising: a source for providing a first voltage which may be either constant or varying and of either positive, negative or alternating polarity; a first resonant circuit tuned to a predetermined frequency; means for momentarily applying said first voltage to said first resonant circuit to initiate a first sinusoidal signal of said predetermined frequency and of a phase and peak amplitude determined by said first voltage; a source for providing a second voltage which may be either constant or varying and of either positive, negative or alternating polarity; a second resonant circuit tuned to said predetermined frequency; means for momentarily applying said second voltage to said second resonant circuit to initiate a second sinusoidal signal of said predetermined frequency and of a phase and peak amplitude determined by said second voltage; a source for providing a third voltage which may be either constant or varying and of either positive, negative or alternating polarity; a load impedance; and means coupled to said first and second resonant circuits and to said third voltage source for coupling said second resonant circuit to said load impedance only during intervals when the instantaneous amplitudes of said first signal and said third voltage are substantially equal to produce a potential across said load impedance that is directly proportional to the product of said second and third voltages and inversely proportional to said first voltage.

10. Computing aparatus comprising: a source for providing a first electrical control effect which may be either constant or varying and of either positive, negative or alternating polarity; a first linear resonant network; means for translating said first control effect to said first linear resonant network to produce a first signal exhibiting a predetermined wave shape and frequency; a source for providing a second electrical control effect which may be either constant or varying and of either positive, negative or alternating polarity; a second linear resonant network; means for translating said second control effect to said second linear resonant network to produce a second signal exhibiting a wave shape and frequency similar to that of said first signal; a source for providing a third electrical signal which may be either constant or varying and of either positive, negative or alternating polarity, the highest frequency component of which is not greater than the frequency of said first signal, and having a predetermined characteristic which coincides with a corresponding characteristic of said first signal during a certain time interval; means coupled to said first and second linear resonant networks and to said third control effect source for sampling said second signal during a time interval determined by said interval of coincidence between said corresponding characteristics of said first signal and said third signal; and means including a load device coupled to said sampling means for deriving an output signal directly proportional to the product of said second control effect and said third signal and inversely proportional to said first control effect.

11. Computing apparatus comprising: a source for providing a first electrical control effect which may be either constant or varying and of either positive, negative or alternating polarity; a first linear resonant network; means for translating said first control effect to said first linear resonant network to produce a first signal exhibiting a predetermined wave shape; a source for providing a second electrical control effect which may be either constant or varying and of either positive, negative or alternating polarity; a second linear resonant network; means for translating said second control effect to said second linear resonant network to produce a second signal exhibiting a wave shape related to said predetermined wave shape; a source for providing a third electrical control effect which may be either constant or varying and of either positive, negative or alternating polarity and having a predetermined characteristic which coincides with a corresponding characteristic of said first signal during a certain time interval; comparator means coupled to said first linear resonant network and to said third control effect source for developing a sampling signal during said interval of coincidence; a load device;

and a sampling device coupling said second linear resonant network to said load device and responsive to said sampling signal to translate a signal from said second linear network to said load device that is directly proportional to the product of said second and third control effects and inversely proportional to said first control effect.

12. Computing apparatus comprising: a source for providing a first electrical control effect which may be either constant or varying and of either positive, negative or alternating polarity; a first linear resonant network; means for momentarily translating said first control effect to said first linear resonant network from time to time to produce a first signal exhibiting a predetermined wave shape; a source for providing a second electrical control effect which may be either constant or varying and of either positive, negative or alternating polarity; a second linear resonant network; means for momentarily translating said second control effect to said second linear resonant network from time to time to produce a second signal exhibiting a wave shape similar to said predetermined wave shape; a source for providing a third electrical control effect which may be either constant or varying and of either positive, negative or alternating polarity and having a predetermined characteristic which coincides with a corresponding characteristic of said first signal during at least two time intervals between successive translations of said first control effect to said first linear resonant network; means coupled to said first and second linear resonant networks and to said third control effect source for sampling said second signal during time intervals determined by said intervals of coincidence between said corresponding characteristics of said first signal and said third control effect; and means including a load device coupled to said sampling means for deriving an output signal directly proportional to the product of said second and third control effects and inversely proportional to said first control effect.

13. Computing apparatus comprising: a source for providing a first electrical control effect which may be either constant or varying and of either positive, negative or alternating polarity; a first linear resonant network; a source for providing a second electrical control effect which may be either constant or varying and of either positive, negative or alternating polarity; a second linear resonant network; means for periodically and synchronously translating said first and second control effects to said first and second linear resonant networks, respectively, to produce in said respective networks first and second signals of similar wave shape; a source for providing a third electrical control effect which may be either constant or varying and of either positive, negative or alternating polarity and having a predetermined characteristic which coincides with a corresponding characteristic of said first signal during at least two time intervals between successive translations of said first control effect to said first linear resonant network; means coupled to said first and second linear resonant networks and to said third control effect source for sampling said second signal during time intervals determined by said intervals of coincidence between said corresponding characteristics of said first signal and said third control effect; and means including a load device coupled to said sampling means for deriving an output signal directly proportional to the product of said second and third control effects and inversely proportional to said first control effect.

14. Computing apparatus comprising: a source for providing a first voltage which may be either constant or varying and of either positive, negative or alternating polarity; a first resonant circuit; means including a first pulse-responsive normally-open switching device coupling said first voltage source to said first resonant circuit; a source of periodically recurring timing pulses; means for applying said timing pulses to said first switching device to effect operation thereof for periodically applying said first voltage to said first resonant circuit to produce a first sinusoidal signal of a phase and peak amplitude determined by said first voltage; a source for providing a second voltage which may be either constant or varying and of either positive, negative or alternating polarity; a second resonant circuit; means including a second pulse-responsive normally-open switching device coupling said second voltage source to said second resonant circuit; means for applying said timing pulses to said second switching device to effect operation thereof for periodically applying said second voltage to said second resonant circuit to produce a second sinusoidal signal of a phase and peak amplitude determined by said second voltage; a source for providing a third voltage which may be either constant or varying and of either positive, negative or alternating polarity and having an amplitude which coincides with that of said first signal during at least two time intervals between successive operations of said first switching device; comparator means coupled to said first resonant circuit and to said third voltage source for developing a sampling pulse during each of said intervals of coincidence; a load impedance; a sampling circuit coupling said second resonant circuit to said load impedance; and means for applying said sampling pulses to said sampling circuit to sample said second signal during said intervals of coincidence for impressing a potential across said load impedance that is directly proportional to the product of said second and third voltages and inversely proportional to said first voltage.

15. Computing apparatus comprising: a source for providing a first voltage which may be either constant or varying and of either positive, negative or alternating polarity; a first resonant circuit tuned to a predetermined resonant frequency; means including a first normally-open switching device coupling said first voltage source to said first resonant circuit to shock excite said first resonant circuit into oscillation at said predetermined frequency; synchronizing means coupled to said first resonant circuit and to said first switching device for synchronously operating said switching device at said predetermined resonant frequency for periodically applying said first voltage to said first resonant circuit to produce a first sinusoidal signal of said predetermined frequency and of a phase and peak amplitude determined by said first voltage; a source for providing a second voltage which may be either constant or varying and of either positive, negative or alternating polarity; a second resonant circuit tuned to said predetermined resonant frequency; means including a second normally-open switching device coupling said second voltage source to said second resonant circuit; means coupling said synchronizing means to said second switching device for synchronously operating said second switching device at said predetermined resonant frequency for periodically applying said second voltage to said second resonant circuit to produce therein a second sinusoidal signal of said predetermined frequency and of a phase and peak amplitude determined by said second voltage; a source for providing a third voltage which may be either constant or varying and of either positive, negative or alternating polarity and having an amplitude which coincides with that of said first signal during at least two time intervals between successive operations of said first switching device; means coupled to said first and second resonant circuits and to said third voltage source for sampling said second signal during time intervals determined by said intervals of coincidence; and means including a load device coupled to said sampling means for deriving an output signal directly proportional to the product of said second and third voltages and inversely proportional to said first voltage.

16. Computing apparatus for deriving the product of a second and a third control effect divided by a first control effect, where the control effects may be either constant or varying and of either positive, negative or alternating polarity, comprising: means including resonant means for developing from said first control effect a predetermined time function having an amplitude characteristic determined by said first control effect; means including resonant means for developing from said second control effect a time function having an amplitude characteristic determined by said second control effect; and means for sampling the time function developed from said second control effect during a time interval determined by a condition of instantaneous coincidence between the time function developed from said first control effect and an amplitude characteristic of said third control effect.

17. Computing apparatus for deriving the product of a second and a third control effect divided by a first control effect, where the control effects may be either constant or varying and of either positive, negative or alternating polarity, comprising: means including resonant means for developing from said first control effect a predetermined first time function having an amplitude characteristic and polarity determined by said first control effect; means including resonant means for developing from said second control effect a second time function which is similar to said first time function and having an amplitude characteristic and polarity determined by said second control effect; means for comparing said first time function with an amplitude characteristic of said third control effect to determine instantaneous coincidence therebetween; and means for sampling said second time function during a time interval determined by the interval of coincidence between said first time function and said third control effect.

References Cited in the file of this patent

UNITED STATES PATENTS 2,652,194 Hirsch ---------------- Sept. 15, 1953

OTHER REFERENCES

Proceedings of the IRE (Broomall et al.), May 1952, pages 568–572.

Trans. of the IRE; Professional Group on Electronic Computers (Freeman et al.), March 1954, pages 11–20.